United States Patent
Kim et al.

(10) Patent No.: US 6,603,721 B2
(45) Date of Patent: Aug. 5, 2003

(54) METHOD AND APPARATUS FOR CONTROLLING THE ROTATION OF A TURNTABLE WHICH IS CAPABLE OF INSTANTLY AND ACCURATELY MOVING A DISC MOUNTING UNIT REGARDLESS OF ROTATION SPEED VARIATION OR AGING OF PARTS

(75) Inventors: Dong Sik Kim, Seoul (KR); Dong Woo Lee, Suwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/891,373

(22) Filed: Jun. 27, 2001

(65) Prior Publication Data

US 2002/0001271 A1 Jan. 3, 2002

(30) Foreign Application Priority Data

Jun. 28, 2000 (KR) ........................................ 2000/35978

(51) Int. Cl.[7] .............................................. G11B 15/18
(52) U.S. Cl. ................................... 369/53.3; 369/30.93
(58) Field of Search ................................ 369/53.3, 229, 369/194, 189, 30.3, 30.8, 30.93, 30.33

(56) References Cited

U.S. PATENT DOCUMENTS

| | | | |
|---|---|---|---|
| 4,549,120 A | * 10/1985 | Banno et al. | ................ 318/254 |
| 4,922,513 A | * 5/1990 | Joichi | ........................... 38/254 |
| 5,898,649 A | 4/1999 | Park | |
| 5,903,527 A | 5/1999 | Park | |
| 6,005,831 A | 12/1999 | Park | |
| 6,091,677 A | * 7/2000 | Akiyama et al. | ........ 369/30.93 |
| 6,285,635 B1 | * 9/2001 | Watanabe et al. | ........ 369/44.27 |

FOREIGN PATENT DOCUMENTS

KR  1998-023464  7/1998

* cited by examiner

*Primary Examiner*—Aristotelis M. Psitos
(74) *Attorney, Agent, or Firm*—Birch, Stewart, Kolasch & Birch, LLP

(57) ABSTRACT

The present invention relates to a method and an apparatus for controlling the rotation of a turntable, in order to move a disk mounting portion selected among a plurality of disk mounting portions installed on the turntable to a pickup side by a key input signal of a user which includes rotating the turntable by supplying a driving voltage to a turntable driving motor, sensing a rotational velocity of the turntable and the extract output delay time Td of the driving voltage of the motor for stopping the pertinent disk mounting portion at a reproducing position on the basis of the sensed rotation velocity, and cutting off the driving voltage output of the turntable driving motor after confirming the approach of the pertinent disk mounting portion to a reproducing position and confirming the output delay time. Accordingly, the disk mounting portion selected by a user is accurately moved to a request position regardless of the rotational velocity variation or aging of parts due to the load quantity variation of the turntable.

14 Claims, 8 Drawing Sheets

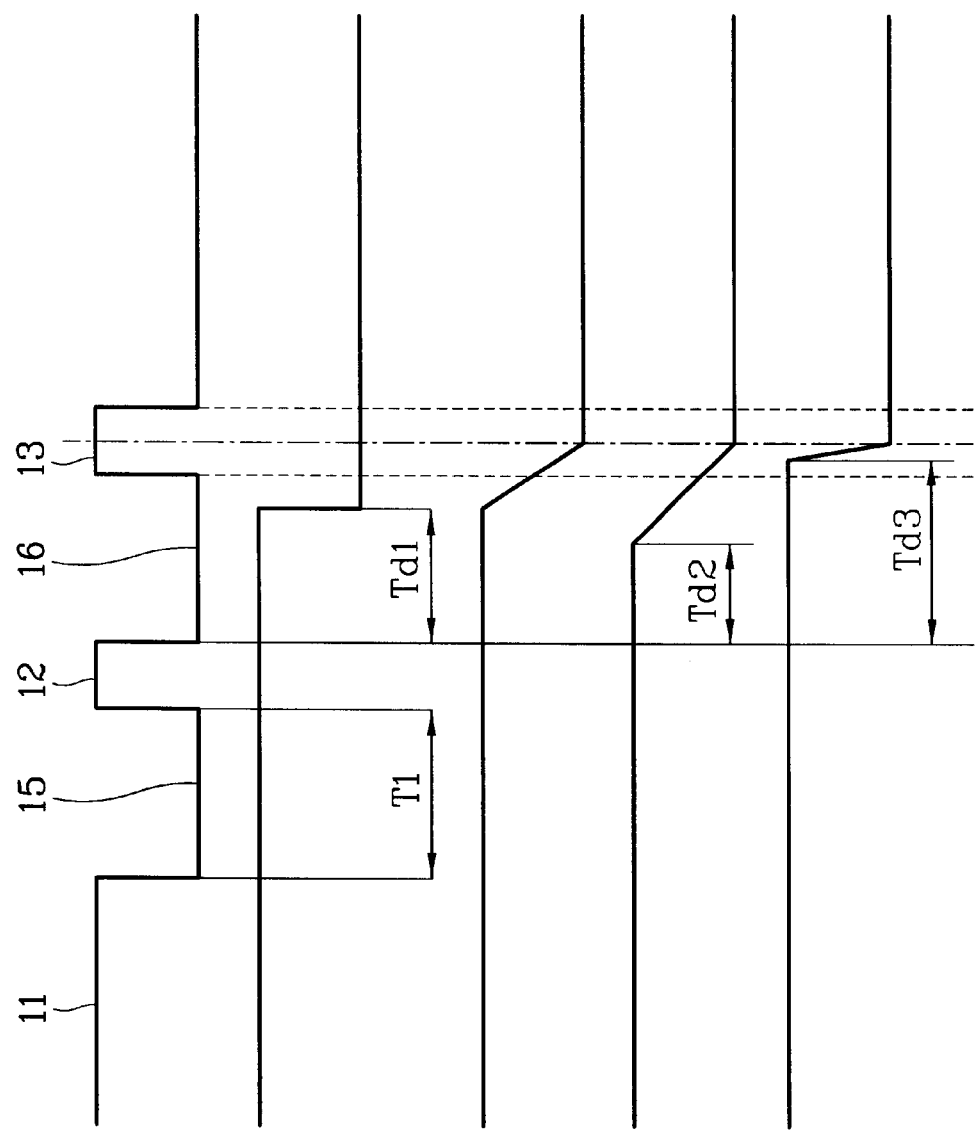

METHOD AND APPARATUS FOR CONTROLLING THE ROTATION OF A TURNTABLE WHICH IS CAPABLE OF INSTANTLY AND ACCURATELY MOVING A DISC MOUNTING UNIT REGARDLESS OF ROTATION SPEED VARIATION OR AGING OF PARTS

BACKGROUND OF THE INVENTION

1. Field of the Invention

The present invention relates to technology for accurately moving a turntable comprising a plurality of disk mounting portions to a scanning position and, more particularly, to a method and an apparatus for controlling the rotation of a turntable which is capable of instantly and accurately moving a disk mounting unit selected by a user to a scanning point regardless of rotation speed variation or aging of parts etc. due to variation of load quantity.

2. Description of the Prior Art

Generally, a disk player is utilized for reproducing data recorded on a disk in video or audio format. However, because all data cannot be recorded on one disk, e.g., when the quantity of data provided to the one disk is too large or the kind of data varies, such as a movie, etc., several disks are required in order to record the data. In this case, a user has to change the disk to record all the data. Accordingly, in order to solve the above-mentioned inconvenience, a disk player is utilized which comprises a disk mounting portion for accommodating a plurality of disks.

FIG. 1 is a plan view illustrating a general turntable which is capable of containing five disks. The turntable 1 comprises an upper surface 1a and back surface 1b. The turntable 1, installed rotatively, comprises five disk mounting portions 2A, 2B, 2C, 2D, 2E at the upper surface 1a in order to mount five disks, and the disk mounting portions 2A~2E comprise a pickup moving slot 3 in order to make a pickup P movable from a main body unit and irradiate a disk. The disk mounting portion is formed so as to accommodate mountable disks having 8 cm diameter and 12 cm diameter.

A rib 4 for distinguishing each disk mounting portion is placed on the back surface 1b of the turntable by forming a protrusion portion having a certain number of sawteeth at a position of concentric circles of a rotation center of the turntable 1. The rib 4 comprises a plurality of position sensing ribs 4A (the number of position sensing ribs in FIG. 1 is five) for generating different number of pulses at a certain position respectively, and a position sensing auxiliary rib 4B placed among the position sensing ribs 4A in order to generate pulses with a certain interval. Each position sensing rib 4A is formed on a lead position of the each disk mounting portions 2A~2E on the centering around rotation direction of the turntable 1, and the position sensing auxiliary rib 4B is formed among the position sensing ribs 4A. Accordingly, as depicted in FIG. 3, each position sensing rib 4A for recognizing the first disk mounting portion 2A comprises two ribs 4A1a, 4A1b and a slot 4A2, and the position sensing rib 4A for recognizing the second disk mounting portion 2B further comprises a rib and a slot. And, as depicted in FIG. 3, the position sensing auxiliary rib 4B comprises four ribs 4B1a, 4B1b, 4B1c, 4B1d sequentially among a plurality of auxiliary slots 4B2a, 4B2b, 4B2c.

In addition, as depicted in FIG. 2, the turntable 1 is installed rotatively on a base 8, and a position sensor 6, including a luminous unit 6A and a light receiving unit 6B, is installed on a printed circuit board placed on the base 8 so as to correspond to the rib 4. When the turntable 1 rotates, because the rib 4 passes between the luminous unit 6A and light receiving unit 6B, the position sensor 6 outputs a high or a low pulse corresponding to a shape of the rib 4, the high or low pulse being provided to a control unit such as a microcomputer through the printed circuit board 7.

Herein, a guide rib 5 having a circular shape is formed on the outer side of the rib 4. A protrusion supporting unit 8A is formed on the base 8 so as to correspond to the guide rib 5 and a felt 9, as a friction member, is fixedly adhered to the protrusion supporting unit 8A. Accordingly, because the guide rib moves along the felt 9, installed on the correspondence surface of the lower part, sag of the turntable 1 can be prevented.

The operation in accordance with the prior art will now be described as follows:

Because the turntable 1 comprises the five disk mounting portions 2A~2E, five disks can be mounted at the same time. One disk mounting portion selected by a user is rotatively moved to a reproducing position, namely, the scanning position of the pickup P. Accordingly, data recorded on the pertinent disk is reproduced. As described above, in order to retrieve a user select disk among the plurality of disks, original numbers are given to the disk mounting portions 2A~2E, respectively. A microcomputer (not shown) controls the rotation of the turntable 1 while grasping the present position of the disk mounting portions 2A~2E by using the circular shaped ribs 4 installed on the backward center of the turntable 1 and position sensor 6, and makes the pertinent disk mounting unit stop at the reproducing position.

In other words, as depicted in FIG. 1, when a motor (not shown) operates and the rotating force is transmitted to the turntable 1, the turntable rotates in the clockwise direction. As depicted in FIG. 2, when the turntable 1 rotates, the rib 4 passes between the luminous unit 6A and light receiving unit 6B of the position sensor 6. Herein, as depicted in FIG. 3, when the rib 4 is placed between the luminous unit 6A and light receiving unit 6B, because light projected from the luminous unit 6A is blocked by the rib 4, the light is not incident to the light receiving unit 6B, and the position sensor 6 outputs a low pulse. However, when a slot is positioned between the luminous unit 6A and light receiving unit 6B, the light is incident to the light receiving unit 6B; and, accordingly, the position sensor 6 outputs a high pulse.

For example, when the turntable 1 rotates in the arrow direction in FIG. 1, the position sensing rib 4A for recognizing the first disk mounting portion 2A passes between the luminous unit 6A and light receiving unit 6B of the position sensor 6, followed by the position sensing auxiliary rib 4B passes. As depicted in FIG. 3, a high pulse 10 is outputted by the position sensing slot 4A2, and three high pulses 12, 13, 14 including a high pulse 11 at a boundary portion are outputted sequentially by the auxiliary slots 4B2a, 4B2b and 4B2c of the position sensing auxiliary rib 4B.

FIG. 5 is a flow chart illustrating a method for controlling the rotation of the turntable in accordance with the conventional art. In order to make the first disk mounting portion 2A stop at a reproducing position, when the motor operates and the rotating force is transmitted to the turntable 1 (step S1), because the slot is one and one high signal occurs when the position sensing rib 4A passes, the microcomputer recognizes the first disk mounting portion 2A (step S2).

Herein, the microcomputer senses the high signal 12 informing the passage of the first auxiliary slot 4B2a of the position sensing auxiliary rib 4B, and cuts off the operating voltage by commanding a stop signal after a certain time Td in order to stop the rotation of the motor (steps S3, S4, S5). According to this procedure, although the driving force of the motor is not transmitted, the turntable 1 rotates more by the rotational inertia force, and stops.

By the same principle, when the position sensing rib 4A for recognizing the second disk mounting portion 2B passes between the luminous unit 6A and lighting unit 6B of the position sensor 6, two high pulses are outputted, and when the position sensing rib 4A for recognizing the fifth disk mounting portion 2E passes therebetween, five high pulses are outputted.

As described above, the microcomputer moves a user select disk mounting portion to a retrieval position by controlling the rotation of the turntable 1 on the basis of the position sensor 6, moving the first disk mounting portion 2A to the retrieval position.

In FIG. 4A, the microcomputer senses the high pulse 10 outputted from the position sensor 6 and the high pulse 11 at the boundary portion by the position sensing rib 4A formed on the lead position of the first disk mounting portion 2A, senses the high pulse 12 in passage of the position sensor 6 of the first auxiliary slot 4B2a of the position sensing auxiliary rib 4B, and cuts off the driving voltage of the turntable driving motor by commanding the stop signal after a certain time from a time when the high pulse 12 is converted into the low pulse.

However, although the driving force transmitted to the turntable 1 is cut off as described above, the turntable 1 stops after rotating by the rotational inertia force.

Accordingly, as depicted in FIGS. 4a and 4c, the stop position of the turntable is set by an experimental method so as to make the second auxiliary slot 4B2b of the position sensing auxiliary rib 4B positioned between the luminous unit 6A and light receiving unit 6B. In other words, a certain time delay Td is set by a trial and error method, the microcomputer senses the high pulse 13 as the second input pulse by the second auxiliary slot 4B2b of the position sensing auxiliary rib 4B, and judges the first disk mounting portion 2A stops at the reproducing position.

However, the rotational velocity of the turntable 1 is differentiated in accordance with the operation state. In other words, the rotation load of the turntable 1 cannot be the same due to the friction force variation between the felt 9 and guide rib 5, the number of installed disks, the surrounding temperature, the humidity, etc., the assembly error of a power transmission means from the motor to the turntable, the dimensional error, etc.

For example, when a load acting on the turntable 1 between an upper limit and a lower limit is called a normal load, as depicted in FIG. 4D, when the first disk mounting portion stops before the second high pulse 13 is inputted by an abnormal load acting on the turntable 1 or by an additional cause, the second rib 4B1b is positioned between the luminous unit 6A and light receiving unit 6B of the position sensor 6, and the low signal occurs, and the microcomputer positions the second auxiliary slot 4B2b of the position sensing auxiliary rib 4B between the luminous unit 6A and light receiving unit 6B of the position sensor 6 by further rotating the turntable driving motor in the clockwise direction.

On the contrary, as depicted in FIG. 4E, when the turntable 1 or first disk mounting portion stops after the second high pulse 13 is inputted due to a load not greater than the normal load which is acting on the turntable 1 or by an additional cause, the microcomputer positions the second auxiliary slot 4B2b of the position sensing auxiliary rib 4B between the luminous unit 6A and light receiving unit 6B of the position sensor 6 by rotating the turntable driving motor in the reverse direction.

When the first disk mounting portion is not stopped at the reproducing position, a damper (not shown) can not be accurately placed at the center of the disk; and, accordingly, it is impossible to perform clamping of the disk.

As described above, in the apparatus for controlling the rotation of the turntable in accordance with the conventional art, because the rotational velocity variation due to the disk weight in accordance with the number of disks installed on the each disk mounting portion, the assembly state of each part, the friction force variation of the felt according to temperature/humidity variation, the rotation load variation due to abrasion of the each part etc. is not considered, it is difficult for the damper to perform the clamping of the disk, and time for operating the turntable driving motor in the clockwise direction or reverse clockwise direction is required until the damper reproduces the select disk after searching the reproducing position. Also, because the product over the normal load in production can not be used, the productivity lowers due to disuse or repair of the product.

SUMMARY OF THE INVENTION

Accordingly, the object of the present invention is to provide a method and an apparatus for controlling the rotation of the turntable which is capable of moving a user select disk mounting portion to a targeted position instantly and accurately, regardless of the variation of rotational velocity or the aging of parts due to variations in the load quantity of the turntable.

In order to achieve the object of the present invention, the apparatus for controlling the rotation of the turntable comprises a turntable having a plurality of disk mounting portions which rotates in accordance with the operation of the driving unit, a key input unit for generating a key signal inputted from a user, a sensor unit for generating a pulse signal by a position sensing rib and a position sensing auxiliary rib, a control unit for generating a control signal by a pulse signal of the sensor unit by being inputted by the key signal of the key input unit, and a driving unit for rotating the turntable in accordance with the control signal provided from the control unit.

The method for controlling the rotation of the turntable in accordance with the present invention in order to move a disk mounting portion selected by a key input signal of a user among the plurality of disk mounting portions installed on the turntable to a pickup side, comprises rotating the turntable by supplying the driving voltage to the turntable driving motor, sensing the rotational velocity of the turntable and extracting the output delay time of the driving voltage of the turntable driving motor for stopping the pertinent disk mounting portion at a reproducing position on the basis of the sensed rotational velocity, and cutting off the driving voltage output of the turntable driving motor by checking the pertinent disk mounting portion which approaches the reproducing position and checking the delay time.

In addition, the method for controlling the rotation of the turntable in accordance with the present invention in order to move a disk mounting portion selected by a key input signal of a user among the plurality of disk mounting portions formed on the turntable to a pickup side, comprises rotating the turntable by supplying the driving voltage to the turntable driving motor, varying the output delay time Td of the driving voltage of the turntable driving motor for sensing the rotational velocity of the turntable and stopping the pertinent disk mounting portion at the reproducing position on the basis of the sensed rotational velocity, and cutting off the driving voltage output of the turntable driving motor.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8A is a wave diagram illustrating the output of a position sensor in accordance with the present invention;

FIG. 8B is a wave diagram illustrating the driving voltage of a motor in accordance with the present invention;

FIG. 8C is a wave diagram illustrating a stop at a reproducing position in normal load in accordance with the present invention;

FIG. 8D is a wave diagram illustrating a stop at a reproducing position in a load not less than a normal load in accordance with the present invention;

FIG. 8E is a wave diagram illustrating a stop at a reproducing position in a load not greater than a normal load in accordance with the present invention;

DETAILED DESCRIPTION OF THE PREFERRED EMBODIMENT

Figure 1:
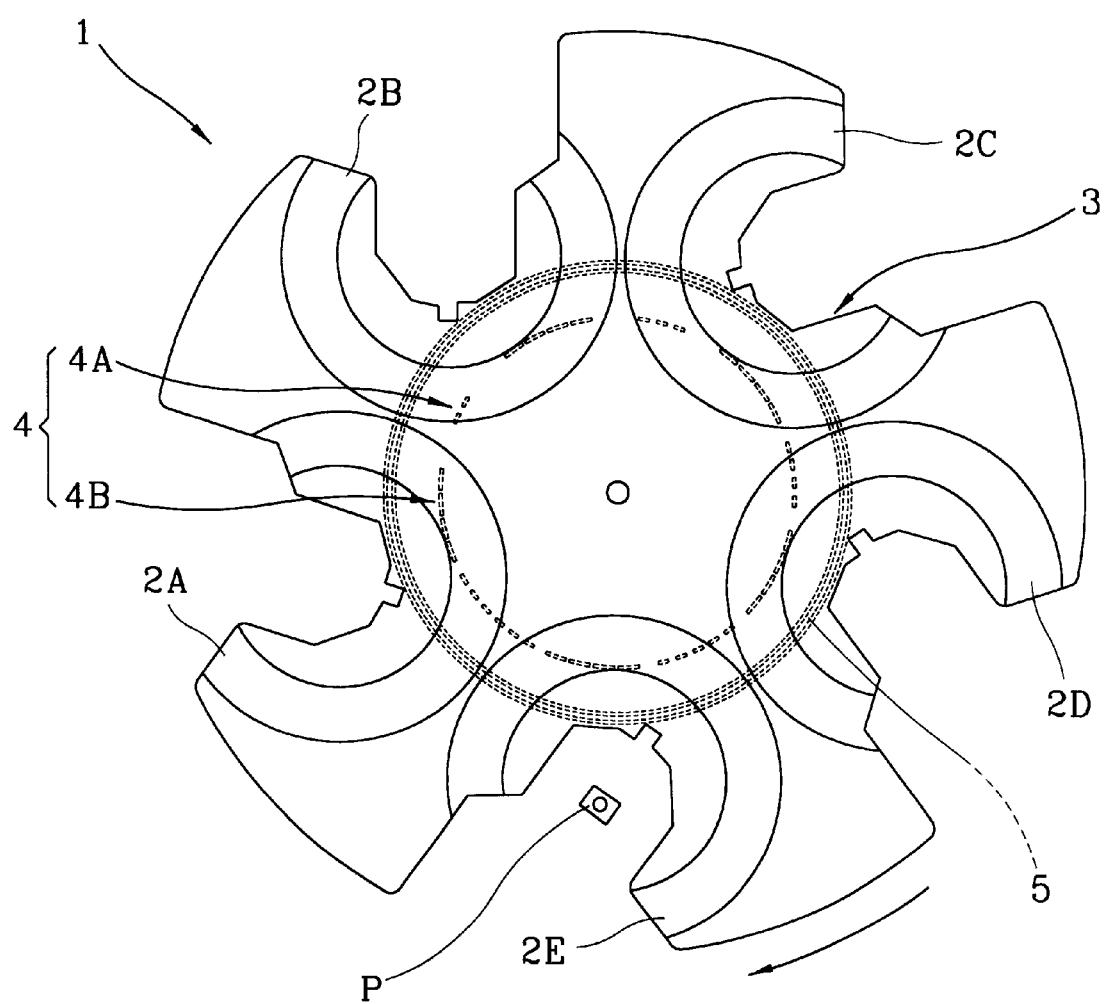
FIG. 1 is a plan view illustrating a general turntable.
Figure 2:
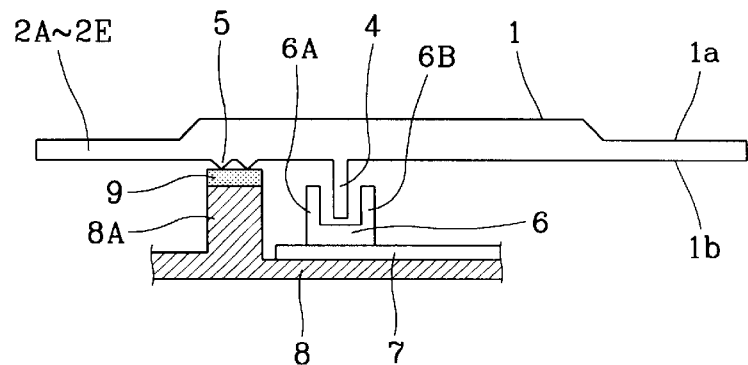
FIG. 2 is a vertical sectional view illustrating a general turntable and a general pickup.
Figure 3:
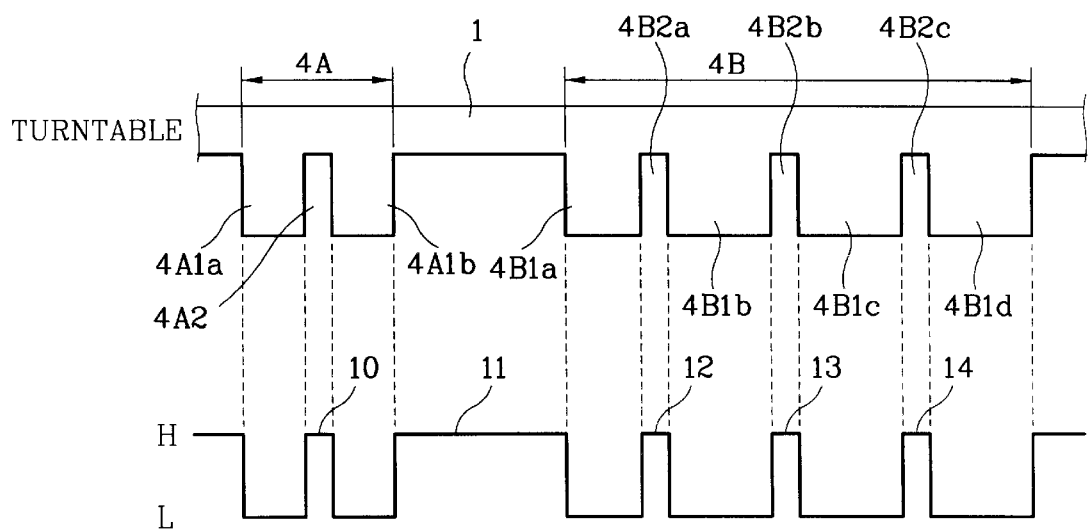
FIG. 3 is a wave diagram illustrating position sensing by a rib and a position sensor.
Figure 4:
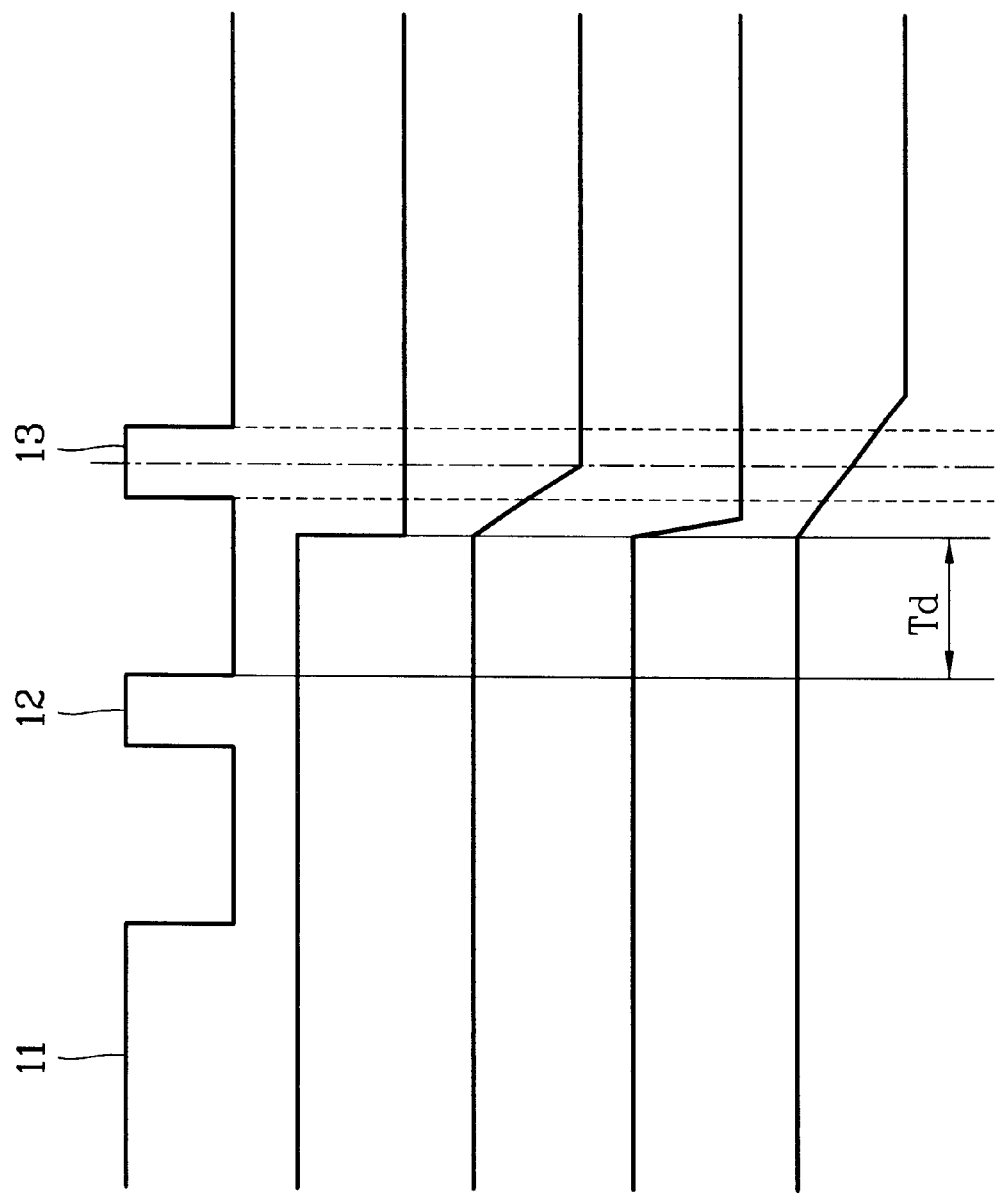
FIG. 4A is a wave diagram illustrating the output of a position sensor.
FIG. 4B is a wave diagram illustrating the driving voltage output of a turntable driving motor.
FIG. 4C is a wave diagram illustrating the reproducing position stop in accordance with a normal load.
FIG. 4D is a wave diagram illustrating a stop at a position preceding a reproducing position in accordance with a load not less than a normal load.
FIG. 4E is a wave diagram illustrating a stop beyond the reproducing position in accordance with a load not greater than a normal load.
Figure 5:
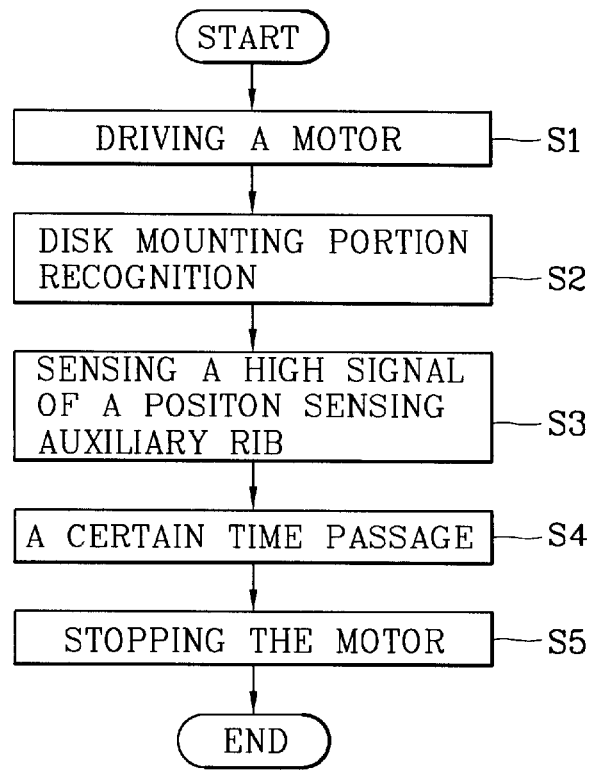
FIG. 5 is a flow chart illustrating a method for controlling the rotation of a general turntable.
Figure 6:
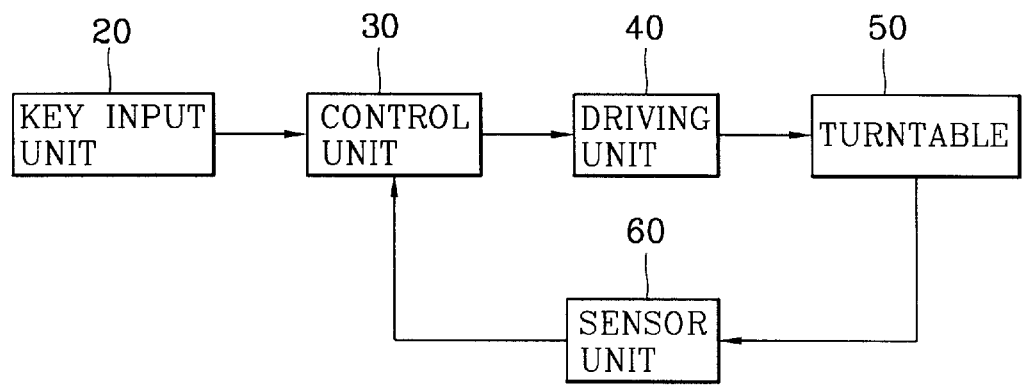
FIG. 6 is a block diagram illustrating an apparatus for controlling the rotation of a turntable in accordance with the present invention.

FIG. 6 is a block diagram illustrating an apparatus for controlling the rotation of a turntable in accordance with the present invention. An apparatus for controlling the rotation of a turntable in order to move a disk mounting position selected by a user from a plurality of disk mounting positions 2A~2E installed on a turntable 1 to a pickup side comprises a key input unit 20 for generating a key signal in accordance with a key input from a user, a sensor unit 60 having a luminous unit and a light receiving unit for generating a pulse signal by a position sensing rib 4A and a position sensing auxiliary rib 4B, a control unit 30 for detecting the rotation of the turntable 1 and for measuring the rotational velocity of the turntable 1 by inputting a key signal from the key input unit 20 and a pulse signal of the sensor unit 60, adjusting the driving voltage supply time of the turntable driving motor in accordance with the measured rotational velocity, and outputting a stop command control signal about the driving voltage of the turntable driving motor, a driving unit 40 for driving the turntable driving motor by generating a driving voltage in accordance with the stop command control signal from the control unit 30, and a turntable 50 accurately moved to a reproducing position regardless of the rotational velocity variation due to load quantity variation by the operation of the turntable driving motor of the driving unit 40.

The operation of the apparatus for controlling the rotation of the turntable in accordance with the present invention will now be described in detail with reference to accompanying FIGS. 7 and 8.

Figures 7A, 7B:
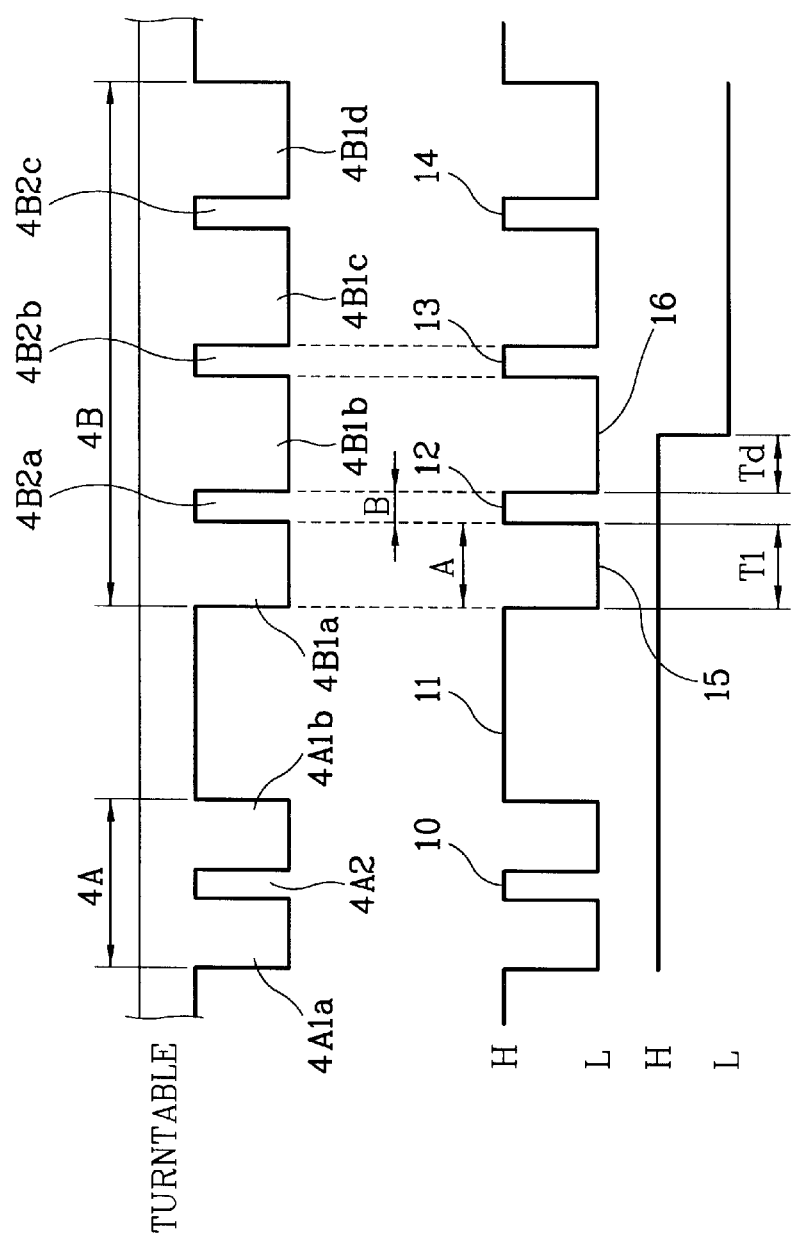
FIG. 7A is a wave diagram illustrating an output of a position sensor in accordance with the present invention.
FIG. 7B is a wave diagram illustrating the cutoff time of a motor driving voltage in accordance with the present invention.

As depicted in FIG. 7A, forming a plurality of disk mounting portions 2A~2E on the turntable 1 and forming a plurality of position sensing ribs 4A and position sensing auxiliary ribs 4B on the back surface of the turntable 1 are the same with the conventional art. A plurality of sensing ribs and a sensing slot are formed on the position sensing rib 4A. Herein, two ribs 4A1a, 4A1b and one slot 4A2 are depicted in FIG. 7A. Four auxiliary ribs 4B1a~4B1d are formed on the position sensing auxiliary rib 4B, and three auxiliary slots 4B2a~4B2c are placed among the auxiliary ribs 4B1a~4B1d.

The number of sensing ribs 4A1a, 4A1b are differentiated in accordance with the disk mounting portion, and the number of sensing ribs and sensing slots increase one by one from the first disk mounting portion 2A to the fifth disk mounting portion 2E.

The operation of the present invention will now be described in detail.

First, reference output time T1 and reference delay time Td1 are set on the basis of an average value between an upper limit and a lower limit of a load acting on the turntable 1 as a normal load. The reference output time T1 is the passage time of the sensor 6 of the first auxiliary rib 4B1a, and the reference delay time Td1 is the time from a point of high to low conversion of the first auxiliary slot 4B2a to a time of a motor driving voltage cut off.

FIGS. 7A and 7B describe constructions of the position sensing rib 4A and the position sensing auxiliary rib 4B for sensing the first disk mounting portion 2A in accordance with the present invention.

When the position sensing slot 4A2 passes the position sensor 6, and after a high pulse 10, describing the original number of the disk mounting portions, is outputted, the microcomputer senses the output time T1 of an A region, namely, the output time T1 of a first low pulse 15 among the pulses outputted from the position sensing auxiliary rib 4B and the position sensor 6, which is generated when the first auxiliary rib 4B1a passes the position sensor 6.

After sensing the T1 value, when the T1 value is the same as the preset reference output time, the present load is judged as a normal load, as depicted in FIG. 8, the driving voltage of the turntable driving motor is outputted continually as same as the first delay time Td1 as the present reference delay time on the basis of a time point of the high into low conversion of the first high pulse 12 generated when the first auxiliary slot 4B2a passes the position sensor 6, and the output of the driving voltage is cut off. In other words, the microcomputer outputs a stop command signal of the driving voltage.

Accordingly, the turntable 1 stops after additional rotating due to its own rotational inertia, as depicted in FIG. 8. The stop position of the turntable 1 is a region where a second high pulse 13 is outputted when the position sensing auxiliary slot 4B2b passes the position sensor 6, and is a time when the pertinent disk mounting portion stops at the reproducing position.

Herein, when the rotation load quantity of the turntable 1 is small, the T1 value is shorter than the reference value, the present load quantity is not greater than the normal value, the rotational velocity of the turntable 1 is judged as fast, as depicted in FIG. 8D, after the second delay time Td2 shorter than the first delay Td1 is passed, and the microcomputer outputs the stop command signal about the driving voltage of the turntable driving motor. Accordingly, the pertinent disk mounting portion stops at the reproducing position. In other words, the microcomputer shortens the delay time of the driving voltage low region of the turntable driving motor after the passage region B of the first slot 4B2a of the position sensing auxiliary rib 4B is ended.

In addition, when the rotation load quantity of the turntable 1 is big, the sensed T1 value is longer than the reference value, the present load is not less than the normal load, and the rotational velocity of the turntable 1 is judged as slow. As depicted in FIG. 8E, after the third delay time Td3 which is a little longer than the first delay time Td1, the microcomputer outputs the stop command signal about the driving voltage of the turntable driving motor. Accordingly, the pertinent disk mounting portion stops at the reproducing position. In other words, the microcomputer increases the delay time of the motor driving voltage low region after the passage region B of the first slot 4B2a of the position sensing auxiliary rib 4B is ended.

In order to determine the relationship between T1 and Td, an experiment is performed, the upper/lower values acted on the turntable are set, and the delay time Td value is counted in order to make the stop position of the turntable driving motor in the rotation of the turntable correspond to a request position in each case.

In addition, in order to vary the rotational velocity of the turntable by varying the load, the T1 value in a no disk state, a three disks mounted state and a five disks state are measured respectively, and the T1 value at a normal temperature (25° C., humidity 60%) condition, a high temperature (45° C., humidity 60%) condition, and a low temperature (0° C., humidity 0%) condition are measured, respectively.

Figure 9:
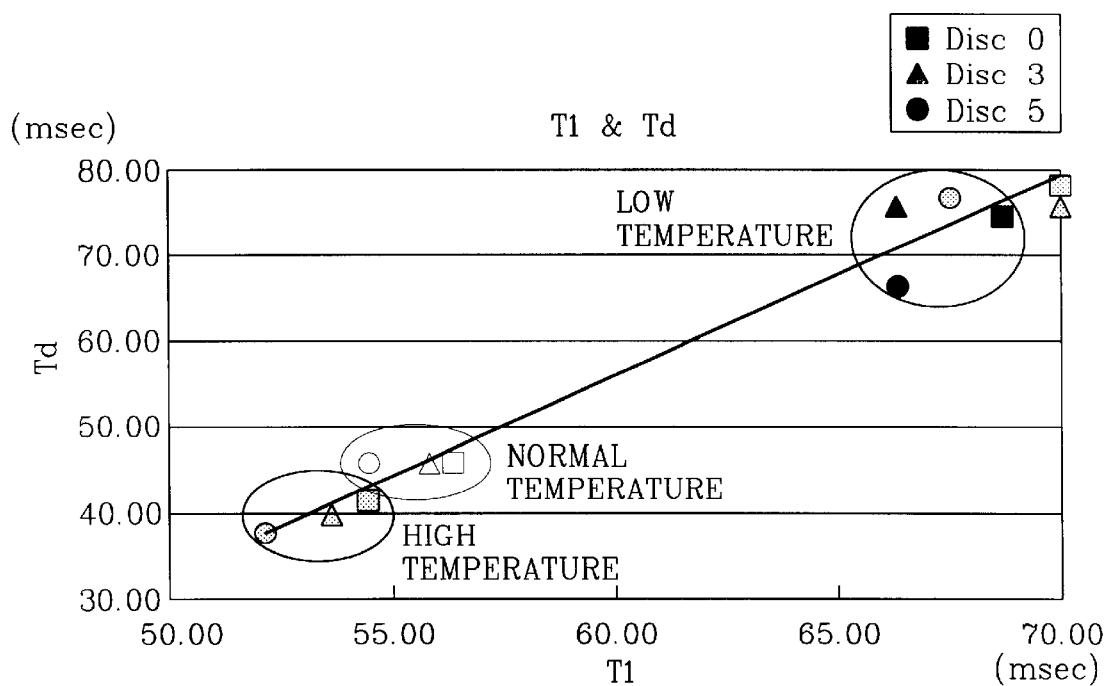
FIG. 9 is a graph illustrating the relationship between T1 and Td drawn from experimentation.

FIG. 9 describes the experimental result. As depicted in FIG. 9, the rotational velocity of the turntable 1 is faster at the high temperature, and the rotational velocity of the turntable 1 is slower at the low temperature. In addition, the rotational velocity of the turntable is varied almost in a straight line, with the relationship being described below as equation 1.

$$Td = K1 \times t1 - K2 \qquad (1)$$

Wherein K1 is 2.3, and K2 is 83.

Accordingly, the stop command signal output time, namely, the delay time for stopping the turntable driving motor in accordance with the rotational velocity of the turntable 1 is calculated with equation 1. Accordingly it is possible to control the motor driving voltage. When an experiment is performed in the same experimental condition by adapting equation 1 in accordance with the present invention, the pertinent disk mounting portion accurately stops at the reproducing position regardless of the variation of the load acted on the turntable. In addition, the value of Td can be adapted by making a variable table value in accordance with the experiment and inputting it to the microcomputer.

Figure 10:
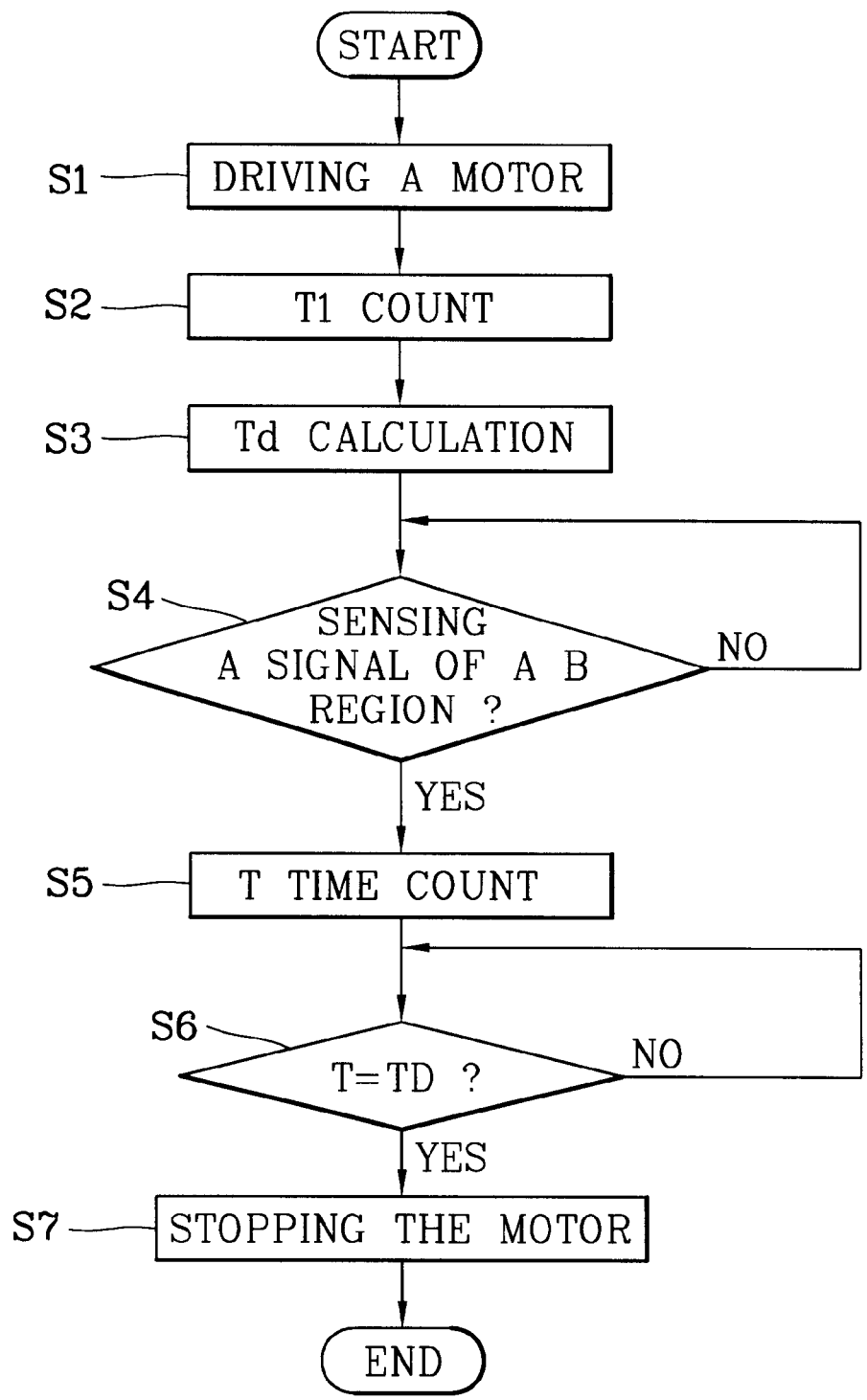
FIG. 10 is a flow chart illustrating a method for controlling rotation of a turntable in accordance with the present invention.

Meanwhile, FIG. 10 is a flow chart illustrating a method for controlling the rotation of a turntable in accordance with the present invention. The control process of the turntable driving motor will now be described with reference to accompanying FIG. 10.

There is a need to rotate the turntable in order to perform the reproduction operation by the key input of a user or by a program, wherein the microcomputer operates the turntable driving motor, and the turntable is rotated (step S1).

Herein, the microcomputer judges whether it is the proper disk by investigating a signal outputted form the position sensor 6 in accordance with the moving of the position sensing rib 4A. In other words, the microcomputer judges whether the selected disk mounting portion approaches a retrieval position.

When the selected disk approaches the retrieval position in the judging result, the output time of the first low pulse 15 among pulses outputted from the first auxiliary rib 4B1a of the position sensing auxiliary rib 4B and position sensor 6, namely, the output time T1 of the A region is sensed (step S2), and the delay time Td is calculated by substituting the sensed T1 value in equation 1 (step S3).

After that, it is judged whether the first high pulse 12, namely, the signal of the B region is sensed by the first slot 4B2a of the position sensing auxiliary rib 4B and position sensor 6, and the turntable is rotated continually by the action of the driving voltage to the motor until the signal of the B region is sensed (step S4).

When the signal of the B region is sensed, the time T from high to low conversion of the signal is sensed (step S5).

The turntable is rotated continually until the counted time T corresponds to the calculated delay time Td (T=Td) (step S6).

When the counted time T and delay time Td correspond to each other, the microcomputer outputs the stop command, and the driving voltage of the turntable driving motor is cut off by the stop command. The turntable 1 does not stop instantly but stops after rotating more by the rotational inertia.

Herein, the stop position of the turntable 1 is a position calculated so as to be the reproducing position as depicted in FIG. 8D or 8E. It is a point in time when a center point of the second high pulse 13 is outputted by the second auxiliary slot 4B2b of the position sensing auxiliary rib 4B.

In order to get the Td value in step S3, the Td value is calculated by equation 1 in accordance with the present invention. In the other method of the present invention, the Td value according to the T1 value is memorized in the microcomputer or memory apparatus in advance, and the Td value is selected in a table in accordance with the counted T1 value.

In the present invention, the passage time of the position sensing auxiliary rib 4B is used in order to sense the rotational velocity of the rotation chain turntable. In another embodiment of the present invention, it is also possible to achieve the same effectiveness when the passage time of the sensing ribs 4A1*a*, 4A1*b* among the position sensing rib 4A for recognizing the disk mounting portion 2A is used.

In addition, sensing the rotational time of turntable 1 as described above, in the another embodiment of the present invention, it is also possible to obtain the same effectiveness when the rotational velocity or driving voltage of the turntable driving motor is used.

As described above, the present invention is capable of moving the one disk mounting portion selected among the plurality of disk mounting portions to the reproducing position regardless of the rotational velocity variation of the turntable due to the variation of the load quantity or aging of the parts by calculating, in advance, additional rotation distance of the turntable due to the rotational inertia after cutting off the driving voltage of the motor, and outputting the stop command from the microcomputer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling the rotation of a turntable in order to move a disk mounting portion selected from a plurality of disk mounting portions provided on the turntable to a reproducing position by a key input signal which comprises rotating the turntable by applying a driving voltage to a turntable driving motor;

sensing the rotation velocity of the turntable and extracting an output delay time Td of the driving voltage of the motor for stopping the disk mounting portion at a reproducing position on the basis of the sensed rotation velocity of the turntable; and cutting off the output of the driving voltage to the turntable driving motor after confirming the approach of the pertinent disk mounting portion to the reproducing position and confirming arrival at the output delay time.

2. The method for controlling the rotation of the turntable according to claim 1, wherein the rotation velocity of the turntable is sensed by a pulse outputted by a rib formed on the turntable and by a position sensor.

3. The method for controlling the rotation of the turntable according to claim 1, wherein the rotation velocity of the turntable is sensed by a position sensing rib for recognizing the disk mounting portion or a pulse generated when a position sensing auxiliary rib passes the position sensor.

4. The method for controlling the rotation of the turntable according to claim 1, wherein the rotation velocity of the turntable is measured by using the rotation of the motor supplying the rotational force to the turntable or the driving voltage.

5. The method for controlling the rotation of the turntable according to claim 1, wherein the output delay time (Td) of the motor driving voltage is acquired by an operation of a constant value determined by the rotation velocity of the sensed turntable and by experiment.

6. The method for controlling the rotation of the turntable according to claim 5, wherein Td=K1×T1−K2, wherein T1 is a pulse output time by the driving of a rib, and K1, K2 are constants.

7. The method for controlling the rotation of the turntable according to claim 1, wherein the Td value is adapted by making out a variable table value in accordance with experiment.

8. A method for controlling the rotation of a turntable in order to move a disk mounting portion selected among a plurality of disk mounting portions installed on a turntable, to a pickup side by a key input signal of a user, which comprises rotating the turntable by supplying a driving voltage to a turntable driving motor;

sensing the rotation velocity of the turntable, and varying an output delay time of the motor driving voltage for stopping the pertinent disk mounting portion on a reproducing position on the basis of the sensed rotation velocity of the turntable; and cutting off the output of the driving voltage to the motor.

9. The method for controlling the rotation of the turntable according to claim 8, wherein the rotation velocity of the turntable is found by sensing the output delay time Td of the motor driving voltage and performing operation of the sensed rotational velocity and a constant value found by an experiment.

10. The method for controlling the rotation of the turntable according to claim 8, wherein an operation equation is Td=K1×T1−K2.

11. A method for controlling the rotation of a turntable in order to move a disk mounting portion selected from among a plurality of disk mounting portions formed on the turntable to a reproducing position in the turntable by a key input signal of a user, including a plurality of ribs and slots for discriminating the position of the disk mounting portion, said method comprising:

rotating the turntable by supplying a driving voltage to a motor;

extracting an output delay time Td by sensing a time when one of said plurality of ribs or slots passes;

detecting a signal indicative of the rib or slot passage, and counting a time T from a point in time when a high signal is converted into a low signal; and stopping supply of the driving voltage when T=Td after comparing the Td and T values.

12. An apparatus for controlling the rotation of a turntable in order to move a disk mounting portion selected from among a plurality of disk mounting portions formed on the turntable to a reproducing position, comprising:

a key input unit for generating a key signal by a key input inputted from a user;

a sensor unit for generating a pulse signal by a position sensing mechanism;

a control unit for measuring a rotational velocity of the turntable by inputting the pulse signal of the sensor unit, adjusting a driving voltage acting time to a turntable driving motor in accordance with a measured rotational velocity, and outputting a stop command control signal about the driving voltage of the turntable driving motor; and a driving unit for driving the turntable driving motor by generating the driving voltage in accordance with the stop command control signal from the control unit;

said turntable being adapted to be moved to the reproducing position accurately regardless of a variation in the rotational velocity due to a variation in load quantity.

13. An apparatus for controlling the rotation of the turntable of claim 12, wherein said sensor unit includes a luminous unit and a light receiving unit.

14. A method for controlling the rotation of a turntable in order to move a disk mounting portion selected from among a plurality of disk mounting portions formed on the turntable to a reproducing position by a key input signal of a user, said turntable including a sensing device for discriminating the position of the disk mounting position, said method comprising:

rotating the turntable by supplying a driving voltage to a motor;

extracting an output delay time Td by sensing a rotation time of the turntable;

judging a signal from the sensing device, and counting a time T from a high/low signal transition point; and stopping supply of the driving voltage when T=Td after comparing the Td and T values.

* * * * *